Nov. 26, 1968 D. R. HARING 3,413,515

ELECTRON BEAM POSITION SENSOR

Filed April 29, 1966 2 Sheets-Sheet 1

INVENTOR.
DONALD R. HARING
BY Kenway, Jenney and Hildreth
ATTORNEYS

Nov. 26, 1968 D. R. HARING 3,413,515

ELECTRON BEAM POSITION SENSOR

Filed April 29, 1966 2 Sheets-Sheet 2

INVENTOR.
DONALD R. HARING

BY Kenway, Jenney and Hildreth

ATTORNEYS

United States Patent Office 3,413,515

Patented Nov. 26, 1968

3,413,515

ELECTRON BEAM POSITION SENSOR

Donald R. Haring, Concord, Mass., assignor to Massachusetts Institute of Technology, Cambridge, Mass., a corporation of Massachusetts Filed Apr. 29, 1966, Ser. No. 546,363
16 Claims. (Cl. 315—18)

ABSTRACT OF THE DISCLOSURE

This invention is concerned with back and forth communications or "conversations" between a man and a digital computer in relation to information items in graphical form which, under control of the computer, are visibly displayed on the screen of a cathode ray tube and which, with the aid of a hand-held sensor for the detection of the point of impact of the beam on the screen, may be altered under control of the man. More specifically, it deals with an improved hand-held sensor which is of high sensitivity and high speed of response.

*Background and field of use*

The rapidity with which a modern high-speed digital computer responds to its instructions and carries out its internal operations is so great that the time required for the over-all operation is often limited by the speed with which the data on which it is to operate and the operating instructions can be translated into machine language and fed to the computer. The standard computer input-output system of today by which a man communicates with the computer requires that he reduce the notions which he wishes to communicate to written language statements suitable for typing. While powerful new computer languages such as FORTRAN, ALGOL and COBOL have been developed to increase the speed of man-computer communication, there are many situations in which communication in this mode is awkward and roundabout. Notable among these are those in which the notions and ideas to be communicated are of the class that is best described graphically: a geometrical figure, a machined element such as a cam, an electric circuit diagram or any one of a multitude of others to which the adage: "A picture is worth a thousand words" applies.

To cope with the problems which arise in these areas and in others like them, there has recently been developed a new and different approach to man-machine communication. It may be termed the "CDS" (Computer-Display-Sensor) approach. It is briefly described by B. F. Gurley and C. E. Woodward in Electronics for November 1959, pages 85–87. A more recent description appears in Spectrum for April 1966, pages 62–72, and particularly pages 65–66. With this approach, items of digital information stored in a "memory" (e.g., a register within the computer or a magnetized tape to which it has access) after conversion to analog form, control the deflection of the electron beam of a cathode ray oscilloscope and, when the beam has been correctly located on the phosphor screen as specified by the information items, turns the beam ON for a brief moment, e.g., ½ microsecond, and then immediately turns it OFF. The beam is not moved while it is turned ON. As a result, a minute spot of light appears, located on the face of the oscilloscope tube exactly as specified. Under control of the next information items of a set, the beam is abruptly moved to another location, halted, turn ON for ½ microsecond and again turned OFF.

Light spots can be caused to appear at neighboring points of the tube face at intervals of 1 to 2 microseconds and at more widely separated points at intervals of much less than a millisecond so that, from the standpoint of a human viewer, they are present simultaneously. Apparatus is available which, operating in this way, can present a light spot in any selected one of 1024 horizontal lines and at any selected one of 1024 laterally spaced points of each horizontal line, or somewhat more than one million points in all.

A systematic grouping of such illuminated points constitutes a pattern; and since such patterns, even very complex ones, rarely require illumination of more than about five percent of the million possible points, it is a simple matter to arrange that the entire pattern be renewed at intervals shorter than the flicker perception time of the human eye so that the pattern, whatever its geometrical arrangement and whatever it may represent, appears steady.

For many purposes it suffices to observe this presentation visually. However, there are many techniques in which some form of nonvisual detection is necessary or desirable in order to develop a signal which identifies the position of a spot or spots within the field of view of the detector. Heretofore the best such detector has been the so-called "Light Pen"; an instrument having the size and shape of an ordinary fountain pen and carrying at its tip a photosensitive element, e.g., a photodiode. When the tip of the pen is juxtaposed with a light spot on the face of the oscilloscope, or a group of such light spots, the photosensitive element delivers an output current. This is amplified, first by a miniature preamplifier in the barrel of the pen and further by an external amplifier. The amplified output is then standardized in amplitude by a clipper, e.g., a trigger circuit, to deliver a "see-no-see" output, and this is employed to signal the computer to take some action with respect to the light spot, or the pattern of light spots, which the pen has just "seen." The computer can follow this instruction without error because, having itself generated the light spots, both in their illuminations and in their locations, it "knows" precisely which spots are in question and which ones are not.

The actions which, on proper command, the computer can take with respect to a selected light spot or a pattern of light spots identified by the light pen are various, and many sophisticated techniques have been developed to instrument them. Among these are topological storage by virtue of which a pattern or figure singled out for treatment can be enlarged, reduced, rotated, smoothed or relocated without alteration of its shape. The movement of a figure may, if desired be caused, with the aid of a feedback loop, to follow or "track" the movement of the hand-held pen over the outside face of the end wall of the cathode ray tube along any path, straight or curved. This tracking action can be accomplished without benefit of any directional sensitivity in the light pen and by virtue of the computer's "knowledge" of the precise location of each spot of which the pattern or figure is constituted and of the instants on the time scale or "time slots" in which they are individually presented. Thus the disappearance of any particular light spot from the field of view of the pen informs the computer of the direction in which the pattern must be moved in order that the same spot shall once more reappear within the field of view. Furthermore a single light spot selected for such movement may be caused to remain illuminated at each of the points which it occupies in the course of its movement. The pen, then, in effect, "draws" a line of light connecting the starting point to the finish point.

To effect each alteration of a pattern of dots, be it translation, rotation, change of size, change of shape, or whatever, the computer must, of course, generate the signals which control the relocation of the cathode beam and turn it ON and OFF at the proper times. Simultaneously with the generation of such signals, they are continuously stored in digital form in the computer's memory, each old set of information items being erased as it is replaced by a new set. Thus when the desired alteration of the pattern has been completed, the digital counterparts of the points of which it is finally composed are the only ones stored: what is stored is a "clean copy" with no erasures or interlineations showing. Of course, the carrying out of any such operation requires a program, and the construction of such programs is a human endeavor and by no means a trivial one. But these programs, once constructed, are on call and can be put to use at a moment's notice whenever they are needed. They are, furthermore, of a more general nature than are the usual word programs with which a computer is ordinarily supplied in connection with the solution of a numerical problem.

*Shortcomings of the light pen sensor*

The light pen, an essential element of the CDS system, as heretofore known, has certain shortcomings:

(a) It operates by virtue of a double conversion of energy, first from the electrical charge in the cathode beam of the oscilloscope to phosphorescent light, and, second, from that light to electric current at its output terminals. Each such conversion is accompanied by losses. The magnitudes of these losses, which are considerable, are discussed by Larry D. Owen in the Proceedings of the IEEE for March 1966, vol. 54, page 423.

(b) Its field of view, when not broadened as by a lens of negative curvature, is about one half inch in diameter, and this is inconveniently narrow for many purposes, notably for the tracking of a figure of greater width. Broadening the field of view by resort to a negative lens, of course, reduces the sensitivity of the pen as a sensor.

(c) It requires a phosphor which gives off a bright light of spectral characteristics that are compatible with those of the photosensitive element in its tip.

(d) Through the conversion from deposited charge to radiated light and from sensed light to electric current, and because of the integrating action of the phosphor, it responds to the entire light flux within its field of view. But this is not of primary interest. Rather, it is each individual increment of charge, which causes illumination of a spot, which should, if possible, be sensed; and with the light pen, these are obscured by the integrating action.

(e) It is sensitive to ambient light, as well as to that of the illuminated dots on the oscilloscope screen. Hence operatons are best conducted in a darkened room, and care must be exercised to avoid accidentally pointing the light pen toward a lighted lamp, lest the pen deliver a spurious signal.

(f) Because of the finite rise times and decay times of the light of the phosphor and of the response of the photosensitive element, its response is too slow to enable it to distinguish between two dots which are illuminated at intervals of less than about eight microseconds. It thus fails to take full advantage of the high speed of the remainder of the apparatus which can illuminate dots at different locations on the screen at intervals of about 1.5 microseconds.

*The beam pen sensor*

The present invention offers a substitute sensor which responds directly to the increments of electric charge on the phosphorescent screen and those in nearer part of the cathode beam which deposits the screen charge. It is wholly insensitive to light so that all restrictions to operation in dim ambient light are removed. So, too, are restrictions as to the nature of the phosphor employed, provided only that an illuminated dot is visible to the human eye. Its field of view, in the simplest embodiment, is about 1.5 inches in diameter, i.e., three times as broad as that of the light pen; and, by refinements described below, this field may be broadened or narrowed at will to suit circumstances and the convenience of the operator. Its operation involves no conversion of energy from one form to another, and therefore none of the losses entailed by such conversion. Aptly termed a "beam pen" to distinguished it from its predecessor, the light pen, it comprises a conductive probe, e.g., the end of a wire, advantageously terminated in a minute conductive plate. When this is placed against the outside face of the oscilloscope tube and opposite to the point, inside of this face, at which an electric charge is deposited by the cathode beam, a charge of opposite sign is induced on the probe, just as in the case of a capacitor, and the variations with time of this induced charge constitute an electric current which, after amplification and shaping, is utilized, just as in the case of the light pen output, to signal the computer. The magnitude of this induced charge depends on the displacement measured in the plane of the tube face, of the external probe from the point of the tube face at which the cathode beam, if extended through the tube wall, would intersect its face, being, of course, greatest when the displacement is zero. With tubes of present day construction the shortest distance between probe and charge, measured by the thickness of the tube face including the protective shield, is about one half inch. Therefore the charge induced on the probe falls off, with lateral displacement of the probe, to about one half its greatest magnitude when the lateral displacement is some two or three times the tube wall thickness. Advantageously, the amplitude of the current delivered by the beam pen is sliced and quantized at half of its maximum or peak amplitude, so that it has a fixed preassigned magnitude for all lesser displacements and zero magnitude for all greater displacements. Thus the field of "view" of the beam pen, i.e., the area throughout which its response is half of its peak response, or more, of about 1.5 inches in diameter. Advantageously, a conductive shielding ring surrounds the probe, and is connected to electrical ground.

As a refinement, an intermediate conductive ring may be included between the central probe and the shielding ring, and this intermediate ring may itself feed an amplifier and deliver an output current. Thus there are provided two probes, of which the first is the central plate or wire and the second the intermediate ring. The currents derived from the two probes may be utilized separately or they may be combined, either additively or subtractively, thus to provide wide variations in the diameter of the field of view of the beam pen.

The coupling between the charge inside the tube and the probe outside of it is capacitive in nature, and the reactance of the coupling "capacitor" is very high. Therefore, the higher the frequency of charge variation, the greater is the strength of the signal applied to the input point of the beam pen amplifier. As a further refinement, therefore, the sensitivity of the system is increased by modulating the intensity of the cathode beam during each of its "turn on" bursts, at a rate that is high compared with the rate at which the bursts succeed each other: with 0.5 microsecond bursts at 1.5 microseconds intervals, a frequency of 10 megacycles per second is suitable. This makes for a sequence of five successive charge bunches in the cathode beam, and therefore five consecutive charge increments deposited on the screen, for each burst. The beam pen amplifier may now be of the tuned variety, its midband frequency being centered at 10 megacycles per second. This makes for a greater Gain-Bandwidth product than is possible with the light pen. For rapidity of response, the passband of the amplifier must of course not be too narrow. A two megacycle band, extending from 9 mc./s. to 11 mc./s. is adequate, and assists in the exclusion of noise, some of which inevitably arises with the random ejection and deposition on the screen of secondary electrons.

The invention will be fully apprehended from the following detailed description of illustrative embodiments thereof taken in connection with the appended drawings in which.

Figure 1:
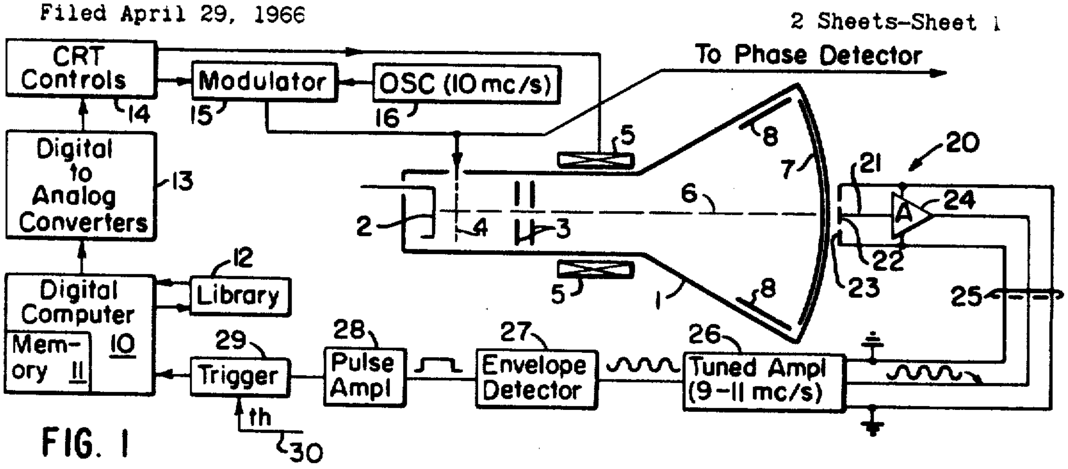
FIG. 1 is a schematic circuit diagram showing a system employing the invention.

Referring now to the drawings, FIG. 1 shows a CDS system including a cathed ray tube 1 having a cathode 2, accelerating electrodes 3, a beam modulating electrode 4 and beam deflecting elements 5, thus to project a fine beam 6 of electrons onto the phosphor screen 7 which lines the inside face of the end wall of the tube 1 and at a point determined by the signals applied to the deflecting elements 5. The deflecting elements 5, which are conventional, are arranged in pairs, disposed for horizontal and vertical deflection, respectively. Only one such pair is shown.

A second anode 8 is included to assist in withdrawing secondary electrons that may be ejected from the screen 7 by bombardment by the beam 6. A digital computer 10 having its own internal memory 11 and having to-and-fro access to an external memory or library 12 delivers its orders, in digital form, to digital-to-analog converters 13 which actuate control circuits 14. These deliver control signals to the deflecting elements 5, thus to position the point of impact of the beam 6 on the phosphor screen 7, and "unblanking" signals to a modulator 15. The modulator 15 is also supplied with the output of a 10 megacycle carrier oscillator 16. Illustratively, each unblanking signal is a pulse which endures for one half microsecond, so that the resulting beam burst consists of five consecutive electron bunches. Each such bunch leaves an increment of electric charge on the screen 7 at the point of impact and, with a secondary emission ratio of less than unity, as is recommended, the sign of this charge increment is negative.

The beam pen 20 is shown schematically outside of the tube end wall. It comprises a probe consisting of a wire 21 bearing at its tip a minute flat, circular plate 22, the other end of the wire extending to the input terminal of a preamplifier 24. The probe is surrounded by a shielding ring 23 which is connected to electrical ground. With a tube which projects a cathode beam 6 of which the diameter is 0.005 inch onto a 10 in. x 10 in. area of the tube face, a probe of which the diameter of the plate 22 is 0.085 inch, surrounded by a shielding ring 23 of which the inside diameter is 0.17 inch, has been employed with success. With one million discretely different dot locations spread over the illustrative tube face area, adjacent ones are spaced apart by 0.01 inch. Hence the dimensions of the probe are comparable with the separation between adjacent dot locations. The amplifier 24 is preferably located as close as possible to the tip of the probe and may be contained in the barrel of a stylus having the shape of an ordinary fountain pen. From the opposite end of the barrel, a conventional coaxial cable 25 of which the outer conductor is connected to the shielding ring 23, carries the output signal from the preamplifier 24 by way of the inner conductor to an external amplifier 26 which may be tuned to the beam bunch rate, e.g., 10 megacycles per second. For each beam burst, the signal input to and output from the tuned amplifier 26 therefore both consist of five consecutive peaks of a 10 megacycle wave. The carrier component is next removed by an envelope detector 27 to leave an approximately rectangular pulse; and after being brought to a suitable level by a pulse amplifier 28, this actuates a trigger circuit 29 to deliver an accurately rectangular pulse to the computer 10.

Figure 2:
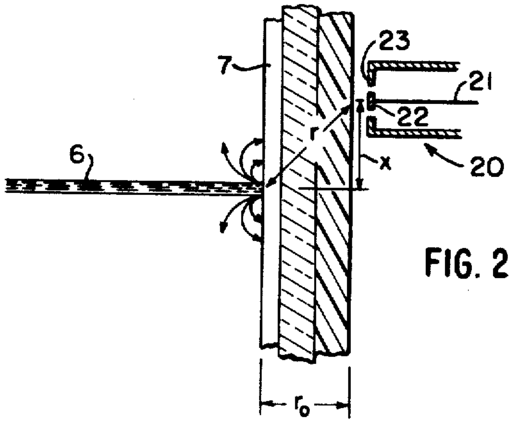
FIG. 2 is a cross-sectional view, to an enlarged scale, of the end wall of a cathode ray tube on the inside face of which a cathode beam impinges and against the outside face of which the sensor of the invention is disposed.

FIG. 2 shows, to an enlarged scale, a portion of the end wall of a conventional cathode ray tube with its protective cover, usually of plastic, outside of it, the phosphor screen 7 with which it is lined, the point of impact of the electron beam 6, and the tip of the beam pen 20 displaced by a distance $x$ from the position in which it would be coaxial with the beam 6. If the distance from the point of impact to the tip of the probe be designated $r$ then, when $x$ is equal to the full thickness of the tube face, namely about ½ inch, $r=\sqrt{2}r_0$, where $r_0$ is the distance straight through the tube end wall; i.e., its thickness. The charge induced on the probe tip by the impacting beam 6 is therefore less, in the position shown, than when the probe is positioned at the point of least separation, i.e., directly opposite the point of impact, and the reduction in magnitude of the induced charge, and consequently of the output current from the amplifier 24 is, in an approximate way, inversely proportional to the displacement $x$. A more exact analysis shows that the induced charge, and therefore the output current of the beam pen, falls to about one half of its maximum value when the displacement $x$ is about 1.5 times the tube wall thickness, or ¾ inch. When the trigger circuit 29 is adjusted to respond to the output pulse from the detector 27 when it has one half or more of its maximum amplitude and not otherwise, as shown by the threshold $T_1$ in FIG. 3, the field of view of the beam pen is thus set at about 1.5 inches diameter, which is suitable for many purposes. The field of view may be enlarged by reducing the threshold, e.g., to $T_2$, and may be diminished by raising the threshold, e.g., to $T_3$. For this purpose the trigger circuit 29 is provided with a threshold control terminal 30.

Figures 4A, 4B, 4C:
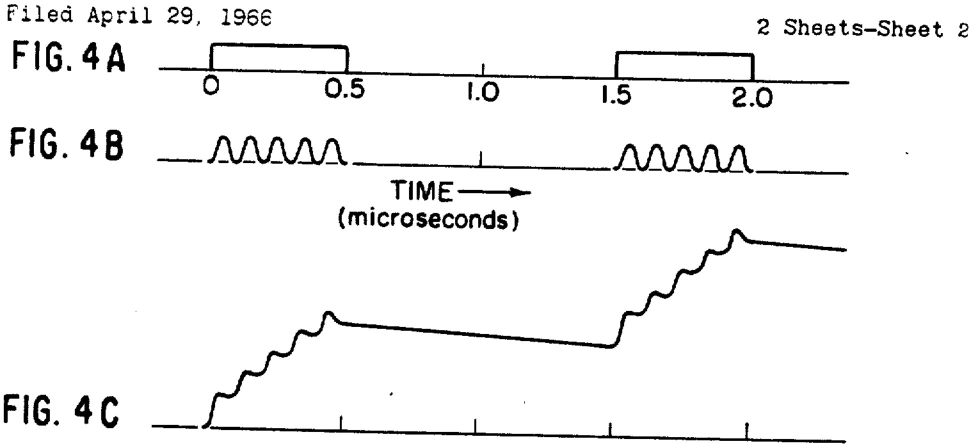
FIGS. 4A, 4B and 4C are wave form diagrams of assistance in the exposition of the operation of the apparatus of FIG. 1.

Each individual charge increment deposited on the phosphor screen 7 by one of the electron bunches of the beam 6 is believed to have a lateral extent several times as great as the diameter of the impinging cathode beam; an extent comparable with the diameter of the plate 22 which terminates the probe. Such a localized deposited charge is of course not dissipated instantaneously. To the contrary, the time constant of the phosphor 7 is of the order of $\frac{1}{10}$ second. Hence the phosphor 7 integrates the charge increments, both from bunch to bunch and from burst to burst, as shown in FIG. 4C, while FIG. 4A and FIG. 4B show the computer-generated-beam-unblanking pulses and the charge density variations or bunches in the cathode beam 6, respectively. Inasmuch as the time constant of the phosphor screen 7 is one million times as long as the interval between consecutive bunches, the ripples of FIG. 4C are much exaggerated. Despite the low amplitude of a ripple, the beam pen 20 easily recognizes the difference between one dot illuminated at one instant and another dot, adjacent to it on the screen, illuminated 1.5 microseconds later. This high speed of response furnishes an indication that the probe senses not only the deposited charge but the consecutive electron bunches of the beam itself before deposition; and for these, of course, there is no integration.

Figure 3:
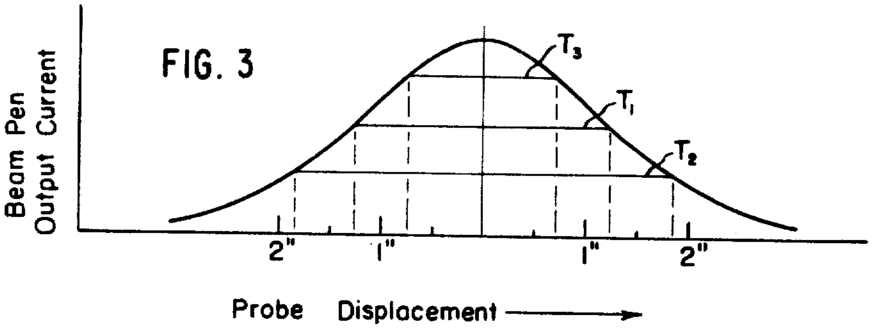
FIG. 3 is a graph showing the response characteristic of the sensor of FIG. 1.

As stated above, and as illustrated in FIG. 3, the field of view of the beam pen 20 may be narrowed by raising the response threshold of the trigger circuit 29 toward the level of the maximum output and may be broadened by reducing it below the half-amplitude level. But since the slope of the displacement-output characteristic has, as shown in FIG. 3, its greatest slope at or close to the half amplitude level, this approach reduces the certainty of operation. A more certain approach is to employ a beam pen having a plurality of concentric probes, each furnishing its own output, and to combine these outputs in various ways.

Figure 5:
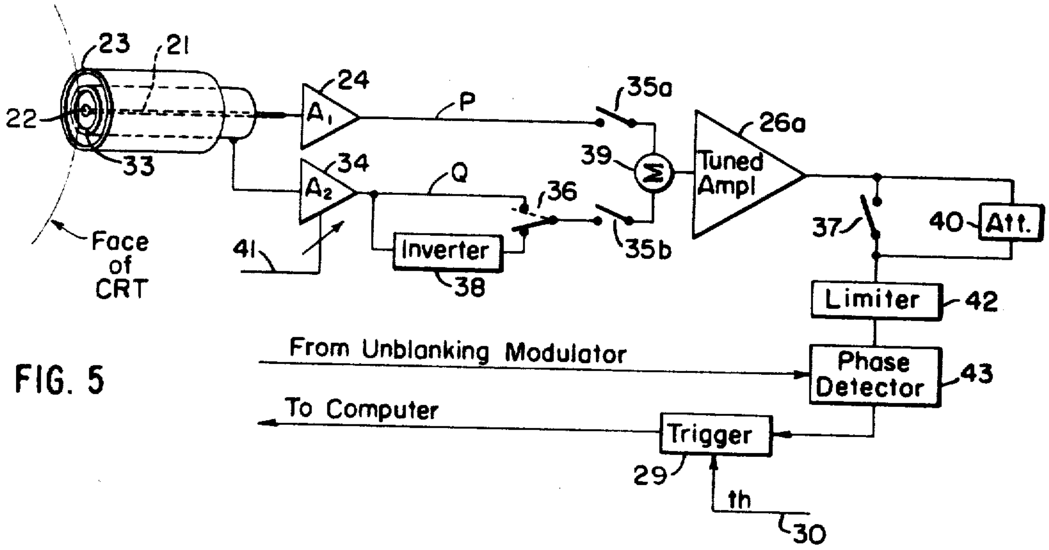
FIG. 5 shows a second embodiment of the sensor of the invention and, schematically, associated circuit refinements.

FIG. 5 shows a double probe embodying this notion. The central probe 21–22, its amplifier 24 and the external shielding ring 23 are as before. Now, however, an intermediate sleeve 33 is provided, coaxial with the first probe 21, 22 and the shield 23, and disposed between them. To it is connected a preamplifier 34 which, like the first preamplifier 24, may be mounted in the barrel of the beam pen 20. Because its sensitive outer end is a ring, its output-displacement curve is characterized by two peaks, separated by a dip. Thus, for equal gains of the two amplifiers 24, 34 and like sensitivities of the probes, the two responses have the forms of the curves P and Q of FIG. 6A. Two manual switches 35*a*, 35*b* are provided, one in the output lead of the first amplifier 24, the other in the output lead of the second amplifier 34. With these switches, either of the two outputs may be selected, or both together. An additional switch 36 introduces a phase inverter 38 into the path of the auxiliary amplifier 34. Calling the first output P and the second output Q, the switches 35*a*, 35*b*, 36 can furnish to a conventional combining element 39 either P or Q, $P+Q$, or $P-Q$, as desired by the operator. Evidently, $P-Q$ gives the narrowest field of view while $P+Q$ gives the broadest field of view. The fields of view given by the P channel alone and the Q channel alone are nearly alike and are of intermediate width.

Figures 6A, 6B:
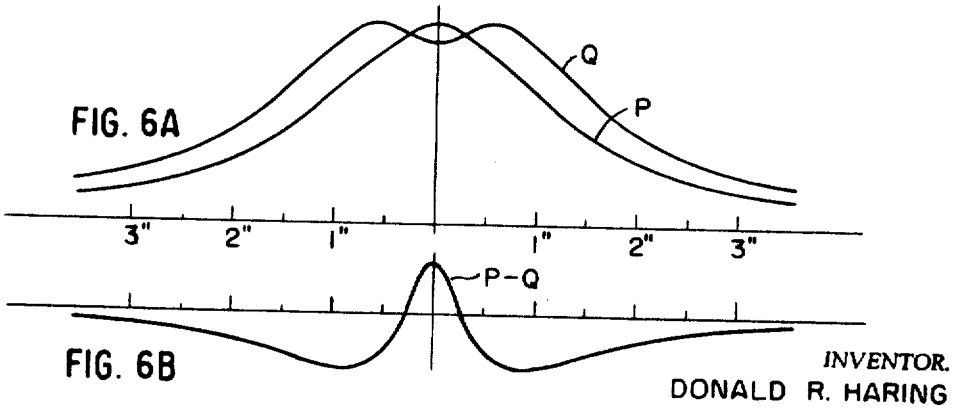
FIG. 6A is a graph showing the response curves of the two probes of the apparatus of FIG. 5.
FIG. 6B is a graph showing the result of combining the responses of the two probes of FIG. 5 differentially.

FIG. 6B shows the difference between the two response curves of FIG. 6A. Because the positive portion of the difference signal ($P-Q$) is of much less strength than either the P signal or the Q signal by itself, it may be desirable, when it is employed, to reduce the threshold of the trigger circuit 29 or to increase the gain of the external amplifier. One arrangement by which this can be accomplished is to remove an attenuator 40 from the output signal path when the difference signal $P-Q$ is desired, and to reinsert it when the difference signal is not desired. A shortcircuiting switch 37 is shown for the purpose. It may, of course, be linked with the inverter switch 36 so that they can be operated by a common control. Because the nearby portions of the skirts of FIG. 6B are negative, phase detection is advantageously employed in this case.

Similarly, when the sum signal $P+Q$ is employed, it may be desirable to raise the threshold of the trigger circuit 29 or to reduce the gain of the external amplifier.

Alteration of the gain of one of the preamplifiers 24, 34 to which end a gain control terminal 41 is shown, furnishes fine adjustments to the diameter of the field of view.

After being combined, additively or subtractively as required, by the combining element 39, the resultant signal is brought to a suitable level for further processing by an amplifier 26*a* which may be identical with the tuned amplifier 26 of FIG. 1. The output of this amplifier, after being passed through a limiter 42, is applied to a phase detector 43 to which is also applied the pulse-modulated carrier wave derived from the modulator 15 of FIG. 1. The output of the phase detector 43, in turn, actuates the trigger circuit 29, and this supplies the signal to the computer 10. With this arrangement, fields of view as broad or as narrow as may be required in special cases may readily be had.

This dual probe arrangement offers the further advantage that the central probe is doubly shielded from external influences, first by the outer shield 23 as before and, additionally, by the sleeve probe 33. Since the highest resolution is usually required for the narrowest fields of view, the dual shielding of the inner probe 21–22 serves a valuable purpose while the lack of it in the case of the outer probe 33 is harmless and inconsequential.

In the illustrative apparatus described above, the current output of the beam pen, after amplification and detection, is immediately applied to the trigger circuit which serves, in part, as an analog-to-digital converter. Under some circumstances it may be of advantage to process the analog output, itself, of a charge sensor before converting it to digital form through the agency of a threshold device or by some other means. The beam pen lends itself readily to each such use, as well as to others that may suggest themselves to those versed in the art.

The invention having now been described, what is claimed is:

1. A device for sensing an electric charge that is locally deposited on the inside face of an end wall of a cathode ray tube by impact of a cathode beam on said face, said device being proportioned for manual juxtaposition with the outer face of said wall and at any location thereon, which comprises a conductive probe of diameter comparable with the separation between adjacent possible points of impact of said beam on said face, a shielding ring disposed concentrically and coplanarly with said probe, an amplifier having an input terminal connected to said probe, an output terminal, and a common terminal connected to said ring, and means for developing a charge-identifying signal from a current delivered by said output terminal.

2. A device as defined in claim 1 wherein the inside diameter of said shielding ring is substantially twice the diameter of said probe.

3. Apparatus as defined in claim 1 wherein said signal-developing means comprises a trigger circuit characterized by a tripping threshold that is of less amplitude than the peak amplitude of the output of said amplifier, and an electrical path extending from the output terminal of said amplifier to said trigger circuit, whereby a charge-induced amplifier output current acts to trip said triger circuit to deliver said charge-identifying signal for any position of said probe for which said current exceeds said threshold.

4. In combination with apparatus as defined in claim 3, means for controllably altering the level of said threshold, thereby to change the dimensions of the field of view of said sensing device.

5. In combination with apparatus as defined in claim 1, a conductive sleeve disposed between said inner probe and said shielding ring and coaxially with and insulated from each of them, an exposed end of said sleeve lying in the plane of said probe and said ring, a second amplifier having an input terminal connected to said sleeve, an output terminal, and a common terminal connected to said ring, means for combining the output currents of said amplifiers, and means for developing the charge-identifying signal from said combined output currents.

6. In combination with apparatus as defined in claim 5, means for inverting the phase of the output current of one of said amplifiers before application of said currents to said combining means, whereby the combination of currents is the difference between the current output of one amplifier and the current output of the other amplifier.

7. In combination with apparatus as defined in claim 6, means for developing the charge-identifying signal from a current difference of one preassigned polarity, said signal-developing means being insensitive to a current difference of opposite polarity.

8. Apparatus as defined in claim 7 wherein said signal-developing means comprises a phase detector.

9. A charge sensing device which comprises a conductive probe, a conductive sleeve surrounding, coaxial with, and insulated from said probe, the tip of said probe lying in the plane of the outer end of said sleeve, a first amplifier having an input terminal connected to said probe, an output terminal and a common terminal, a second amplifier having an input terminal connected to said sleeve, an output terminal and a common terminal, means for differentially combining the output currents delivered by said amplifiers, and means for developing a signal from a current difference that is of a preassigned polarity.

10. In combination with apparatus as defined in claim 9, a conductive ring surrounding, coaxial with and insulated from said probe and said sleeve, said probe, said sleeve and said ring being equally spaced apart in the radial direction, the common terminals of both amplifiers being connected to said ring.

11. In a computer-display-sensor system wherein a computer determines the location of the point on the inside face of the end wall of a cathode ray tube at which an electron beam impinges on said face, and, having located said point as called for by a program, applies an unblanking pulse to a control electrode of said tube, thus to deliver a brief beam burst to said face, means for signaling said location which comprises a charge-sensitive device comprising a conductive probe of diameter comparable with the separation between adjacent possible points of impact of said beam and proportioned to be disposed adjacent the outside face of said end wall, a shielding ring disposed concentrically and coplanarly with said probe, the inside diameter of said ring being of the order of twice the diameter of said probe, the outside diameter of said ring being at least several times its inside diameter, and means for converting charge increments induced on said probe by said beam into an electric signal current.

12. Apparatus as defined in claim 11 wherein said converting means comprises a preamplifier disposed immediately adjacent to said probe, said preamplifier having an input terminal, an output terminal and a common terminal, said input terminal being connected to said probe and said common terminal being connected to said shielding ring.

13. In combination with apparatus as defined in claim 12, a trigger circuit having a tripping threshold, and an electric circuit path extending from said preamplifier to said trigger circuit, thereby to deliver a two-valued output signal having a first value when the amplified current output of said probe exceeds said threshold and a second value when said probe output current is less than said threshold.

14. In combination with apparatus as defined in claim 13, a signal path extending from said trigger circuit to said computer, thereby to inform said computer that said beam location lies within the field of view of said probe.

15. In a computer-display-sensor system wherein a computer controls the location on the inside face of the end wall of a cathode ray tube at which an electron beam impinges on said face and, having located said point as called for by a program, applies an unblanking pulse to a control electrode of said tube, thus to deliver a brief beam burst to said face, a carrier oscillator proportioned to deliver a signal of a frequency at least several times as high as the rate at which consecutive beam bursts can follow each other, means for intermodulating the signal output of said oscillator by each unblanking pulse, whereby each beam burst is constituted of a sequence of charge bunches that recur at the carrier frequency, means for sensing the location of the point of impact of said beam on said tube face which comprises a charge-sensitive device comprising a conductive probe proportioned to be disposed adjacent the outside face of said end wall, an amplifier having an input terminal connected to said probe and an output terminal, said amplifier being of the band pass type and having a midband frequency equal to that of said carrier oscillator, a detector supplied by the output current of said amplifier for removing from said current the carrier frequency component, and an action-influencing path extending from said detector to said computer.

16. Apparatus as defined in claim 15 wherein the lateral dimensions of said probe are comparable with the separation between adjacent possible points of impact of said beam on said face.

References Cited

UNITED STATES PATENTS

| | | | |
|---|---|---|---|
| 3,089,918 | 5/1963 | Graham | 340—324.1 |
| 3,337,860 | 8/1967 | O'Hara | 315—18 X |

RODNEY D. BENNETT, *Primary Examiner.*

J. P. MORRIS, *Assistant Examiner.*